(12) United States Patent
Wenzel et al.

(10) Patent No.: US 11,055,883 B2
(45) Date of Patent: Jul. 6, 2021

(54) MAGNETIC RESONANCE SYSTEM AND METHOD FOR PRODUCING IMAGES

(71) Applicant: Fraunhofer-Gesellschaft zur Foerderung der angewandten Forschung e.V., Munich (DE)

(72) Inventors: Markus Wenzel, Hamburg (DE); Klaus Eickel, Bremen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 214 days.

(21) Appl. No.: 16/317,634

(22) PCT Filed: Jul. 4, 2017

(86) PCT No.: PCT/EP2017/066657
§ 371 (c)(1),
(2) Date: Jan. 14, 2019

(87) PCT Pub. No.: WO2018/011022
PCT Pub. Date: Jan. 18, 2018

(65) Prior Publication Data
US 2019/0311506 A1    Oct. 10, 2019

(30) Foreign Application Priority Data

Jul. 15, 2016 (DE) .......................... 102016113138.5

(51) Int. Cl.
*G06T 11/00* (2006.01)
*G06K 9/62* (2006.01)
(Continued)

(52) U.S. Cl.
CPC .......... *G06T 11/008* (2013.01); *G06K 9/6256* (2013.01); *G06T 5/002* (2013.01);
(Continued)

(58) Field of Classification Search
None
See application file for complete search history.

(56) References Cited

U.S. PATENT DOCUMENTS

2008/0100292 A1* 5/2008 Hancu ................. G01R 33/246
324/307
2009/0115413 A1* 5/2009 Senegas ............. G01R 33/5611
324/309
(Continued)

FOREIGN PATENT DOCUMENTS

DE      10 2008 032 996          1/2010

OTHER PUBLICATIONS

Karhunen, Juha, et al. "A class of neural networks for independent component analysis." IEEE Transactions on neural networks 8.3 (1997): 486-504. (Year: 1997).*

(Continued)

*Primary Examiner* — Samah A Beg
(74) *Attorney, Agent, or Firm* — Ellen M. Bierman; Lowe Graham Jones PLLC (57) ABSTRACT

A method, system, and computer-readable medium for producing images is described. The system comprises an input image providing unit for providing input images in which structures that are in fact spatially separated are represented in a spatially superimposed manner in at least one spatial direction. The system further comprises a neural network providing unit for providing a neural network which is adapted to produce, on the basis of input images in which structures that are in fact spatially separated are represented in a spatially superimposed manner in at least one spatial direction, output images in which the structures that are in fact spatially separated are represented in a spatially separated manner in the at least one spatial direction. Finally, an (Continued)

image producing unit produces images on the basis of the input images provided and the neural network provided.

15 Claims, 8 Drawing Sheets

(51) Int. Cl.
    *G06T 5/00*         (2006.01)
    *G06T 5/50*         (2006.01)

(52) U.S. Cl.
    CPC ...... *G06T 5/50* (2013.01); *G06T 2207/10088* (2013.01); *G06T 2207/20081* (2013.01); *G06T 2207/20084* (2013.01); *G06T 2207/20182* (2013.01)

(56) References Cited

U.S. PATENT DOCUMENTS

| | | |
|---|---|---|
| 2010/0266185 A1 | 10/2010 | Matulewicz |
| 2011/0181285 A1 | 7/2011 | Greiser |
| 2014/0225612 A1 | 8/2014 | Polimeni et al. |

OTHER PUBLICATIONS

Larkman, David J., et al. "Use of multicoil arrays for separation of signal from multiple slices simultaneously excited." Journal of Magnetic Resonance Imaging: An Official Journal of the International Society for Magnetic Resonance in Medicine 13.2 (2001): 313-317. (Year: 2001).*

McKeown, Martin J., et al. "Analysis of fMRI data by blind separation into independent spatial components." Human brain mapping 6.3 (1998): 160-188. (Year: 1998).*

Breuer et al., "Controlled Aliasing in Parallel Imaging Results in Higher Acceleration (CAIPIRINHA) for Multi-Slice Imaging," Magnetic Resonance in Medicine 53:684-691 (2005), 8 pages.

International Search Report completed Oct. 9, 2017, in International Patent Application No. PCT/EP2017/066657 (+ English translation), 7 pages.

LeCun et al., "Deep Learning," Nature, vol. 521, May 28, 2015, pp. 436-444, DOI: 10.1038/nature14539.

Milletari et al., "Hough-CNN: Deep Learning for Segmentation of Deep Brain Regions in MRI and Ultrasound," Jan. 31, 2016, Seiten 1-34, XP055334930, DOI: 10.1016/j.cviu.2017.04.002, located on the Internet at https://arxiv.org/pdf/1601.07014v3.pdf.

Pereira et al., "Brain Tumor Segmentation Using Convolutional Neural Networks in MRI Images," IEEE Transactions on Medical Imaging, vol. 35, No. 5, May 2016, 12 pages.

Setsompop et al., "Blipped-Controlled Aliasing in Parallel Imaging for Simultaneous Multislice Echo Planar Imaging With Reduced g-Factor Penalty," Magnetic Resonance in Medicine, 67:1210-1224, 2012.

Written Opinion of the International Searching Authority completed Oct. 9, 2017, in International Patent Application No. PCT/EP2017/066657, 5 pages.

\* cited by examiner

MAGNETIC RESONANCE SYSTEM AND METHOD FOR PRODUCING IMAGES

CROSS-REFERENCE TO RELATED APPLICATIONS

This application is a U.S. national phase of International Patent Application No. PCT/EP2017/066657 filed Jul. 4, 2017; which claims priority from German Patent Application No. 102016113138.5 filed Jul. 15, 2016, the contents of which applications are incorporated herein by reference in their entireties.

TECHNICAL FIELD

This disclosure relates to a system, a method and a computer program code for producing images.

BACKGROUND

Serially processing MR signals measured by magnetic resonance imaging (MRI), such that a one-, two-, three- or higher-dimensional image with grayscale contrast can be produced, is known from the prior art. Many of these serial imaging steps are processed successively in a modular manner, with sequencing based on the technical and physical causes and principles involved. Steps to correct systematic measurement deviations are initially applied in most cases, followed by the application of algorithms specific to the type of imaging being performed.

Producing MR images in this way consumes a relatively large amount of time, which can be reduced by using a plurality of receiver coils. Full spatial differentiation of the MR signals is basically dispensed with in such cases, and any spatially dependent reception sensitivity of the respective receiver coil, i.e. the "coil profile", is utilized when producing the final images with spatial differentiation. Prior to that, however, a training process using individually acquired reference data (autocalibration signal (ACS) data) is needed to determine the coil profiles. This principle is applied in parallel imaging (PI), for example, or in simultaneous multislice imaging (SMS). What is problematic in this regard is above all the additional measurement effort involved in acquiring the reference data (ACS data). Acquiring these additional data generally consumes a significant amount of time.

Any changes made to geometric arrangements, due to movement, for example, constitute a problem with regard to the usefulness of the reference data, because even minor disturbances make it necessary to have new reference data in order to take account of those disturbances and to produce good quality images. In addition to aspects relating to the actual acquisition of reference data and to system stability, PI or SMI imaging itself is a step within the overall process that is in need of improvement when imaging is greatly accelerated. This particularly applies to the speed with which the MR signals are processed, as computing-intensive operations and the serial structure of individual imaging modules may result in significant waiting times between data acquisition and image production.

The reference data (the ACS data) are additionally acquired either before, during or after the actual MR measurements are performed. These ACS data are used to "assign" the coil geometry to the respective image location points, and this assignment subsequently forms a deconvolution matrix with which the low-sampled measurement data can be almost completely reconstructed. In the SMS process, MR signals are generated by joint excitation in N spatially differentiated, two-dimensional slices and recorded, where N is the number of slices that are simultaneously excited in each case. The MR signals are reconstructed to form MR images in which the information for the N different slices is initially presented on an equal basis. Depending on the respective coil profile, however, there are differences in the information produced with the aid of the respective receiver coils for each individual slice. Finally, it is possible by measuring and using the reference data to produce MR images in which the slice information is represented in a spatially differentiated manner. One algorithm that can be used for this purpose is the slice-GRAPPA algorithm, which is disclosed, for example, in the article entitled "Blipped-controlled aliasing in parallel imaging (blipped-CAIPI) for simultaneous multislice EPI with reduced g-factor penalty" by K. Setsompop et al., Magnetic Resonance in Medicine, 67(5), pp. 1210-1224 (2012). However, that method is relatively time-consuming and is not used in generalized form, but only for a specific configuration.

DETAILED DESCRIPTION

A system, method and computer program code for producing images that allows a reduction in the amount of time needed to produce the images is described.

An example system for producing images, comprises:

an input image providing unit for providing input images in which structures that are in fact spatially separated are represented in a spatially superimposed manner in at least one spatial direction, a neural network providing unit for providing a neural network which is adapted to produce, on the basis of input images in which structures that are in fact spatially separated are represented in a spatially superimposed manner in at least one spatial direction, output images in which the structures that are in fact spatially separated are represented in a spatially separated manner in the at least one spatial direction, and an image producing unit for producing images on the basis of the input images provided and the neural network provided.

It is possible to use the neural network to produce the images in such a way, on the basis of the input images provided, that the structures that are in fact spatially separated are also represented in a spatially separated manner in the at least one spatial direction, without, for example, reference measurements having to be performed immediately before the input images are produced. The time required to produce an image of a patient, for example, can thus be reduced. In a hospital, for example, the length of time that a patient must spend in the imaging system can be reduced.

The input image providing unit may be a storage unit, for example, in which the input images are stored and which is able to provide the stored input images. However, the input image providing unit may also be a receiver unit which is adapted to receive the input images from an input image producing unit. The input image providing unit may also be the input image producing unit itself The input image providing unit may be adapted to represent the structures that are in fact spatially separated in a spatially superimposed manner in one spatial direction, in two spatial directions or in three spatial directions. In one example, an input image may show a slice in which structures are represented that are in fact located in different slices, whereby these structures may be offset in relation to one another in the slice being shown, such that they are represented in a superimposed manner in a spatial direction perpendicular to that imaged slice. If, in this example, a coordinate system has x and y axes within the slice and a z axis perpendicular to that slice, then these structures would be represented at the same z position and thus in a superimposed manner in relation to the z spatial direction or z axis.

The neural network providing unit may be a storage unit that is adapted to provide the neural network. The neural network providing unit may also be a receiver unit that receives a neural network from a neural network training unit, for example. The neural network providing unit may also itself be a neural network training unit that provides the trained neural network.

The input images and the output images are preferably MR images. More specifically, the input images are MR images produced by exciting a plurality of object regions to be imaged, wherein structures located in said regions are represented in a spatially superimposed manner in at least one spatial direction, and the output images are MR images in which the spatially separate structures located in the excited regions are represented in a spatially separated manner in the at least one spatial direction. This means that the input images are preferably MR images produced by exciting a plurality of object regions to be imaged, wherein structures located in said regions are represented in a spatially superimposed manner in at least one spatial direction, and the output images are MR images in which the spatially separate structures located in the excited regions are represented in a spatially separated manner in the at least one spatial direction. The input image providing unit may thus be adapted to provide the respective MR images, and the neural network providing unit may be adapted, in combination with the image producing unit, to produce the respective MR images as output images, on the basis of those MR images that are provided. The regions may be two-dimensional slices or three-dimensional volumes.

The input images are preferably MR images produced using a plurality of receiver coils. For each receiver coil, at least one MR image produced by exciting a plurality of object regions to be imaged is provided as an input image, wherein structures located in those regions are represented in a spatially superimposed manner in at least one spatial direction. This means that, for each receiver coil, at least one MR image produced by jointly exciting, preferably simultaneously, a plurality of object regions to be imaged, is preferably provided as an input image, wherein structures located in those regions are represented in a spatially superimposed manner in at least one spatial direction. For example, the input image providing unit is adapted to provide multiple sets of input images, wherein input images from the same set are produced by exciting the same regions and by using multiple receiver coils, and input images from different sets are produced by exciting different regions, wherein the neural network is adapted to produce, for each set of input images, a set of output images in which the excited regions are represented in a spatially separated manner, the image producing unit being adapted to register the output images from different sets with each other. This means that, for example for each receiver coil and for each group of object regions that are jointly excited, in particular simultaneously, it is possible to produce, as an input image, an MR image in which structures located in different regions are represented in a superimposed manner. These input images are used in conjunction with the neural network to produce, as output images, MR images in which the structures located in the different regions are represented as spatially separated. Given that the object, which is preferably a patient, might move at some point during the production of different sets of input images, the output images from different sets are registered with each other, thus allowing the prevention of motion artifacts. In existing systems described above in which reference data are used, motion of the object results in motion artifacts which cannot be removed by simple registration. The present system and methods thus allows not only faster production of images, but also a significant reduction in motion artifacts.

The neural network providing unit is preferably adapted to provide a deep learning network as the neural network. These "deep" neural networks can learn hierarchical information structures, such that it is also possible for context and spatial orientations to be represented very well in the neural network. This results in a further improvement in image production.

The system may further comprise a) a training input image providing unit for providing training input images in which structures that are in fact spatially separated are represented in a spatially superimposed manner in at least one spatial direction, b) a training output image providing unit for providing training output images in which the structures that are in fact spatially separated are represented in a spatially separated manner in the at least one spatial direction, and c) a neural network training unit for training the neural network in such a way that the training output images are outputted when the training input images are inputted into the neural network. The training output image providing unit is preferably adapted to provide, as training output images, MR images of individual, separately excited regions of an object, such that structures located in different regions are not represented in a superimposed manner in any spatial direction in the training output images, the training input image providing unit being adapted to provide training input images in which the structures located in the different regions are represented in a spatially superimposed manner in at least one spatial direction. This makes it possible, for example, to further train a neural network which is already provided, and in particular which has already been trained, using MR images obtained from operating the system. This further training can result in a further improvement of the system for providing images. The training units also enable an untrained neural network to train for the first time with the system to be used for producing the images. The training units can be used accordingly to produce a system-specific neural network.

At least part of the training input images may be produced by MR measurements. Alternatively or additionally thereto, at least part of the training input images may be produced synthetically on the basis of the training output images provided. The training input images can thus be produced completely by MR measurements, partly synthetically, or also fully synthetically. For example, training input images representing the individual slices through an object and which thus represent structures located in those slices in a spatially differentiated manner, can be combined to synthetically produce training input images in which these structures that are in fact located in different slices are represented in a spatially undifferentiated manner.

The training input image providing unit may be adapted to provide input images containing image artifacts, and the training output image providing unit may be adapted to provide training output images which do not contain image artifacts. The image artifacts may be motion artifacts, for example, that is, artifacts resulting from movement. In this way, the neural network can also be trained to reduce image artifacts, with the result that the system for producing images can be further improved.

A training device and method for training a neural network is also described wherein, said training device comprises:

a training input image providing unit for providing training input images in which structures that are in fact spatially separated are represented in a spatially superimposed manner in at least one spatial direction, a training output image providing unit for providing training output images in which the structures that are in fact spatially separated are represented in a spatially separated manner in the at least one spatial direction, a neural network providing unit for providing a neural network, and a neural network training unit for training the neural network in such a way that the training output images are outputted when the training input images are inputted into the neural network.

The training device can be integrated into a system for producing images, or it can be a separate device. The training input image providing unit may be a storage unit in which the training input images are stored to allow the training input images to be provided. The training input image providing unit may also be a receiver unit for receiving training input images, for example from a training input image producing unit. The training input image providing unit may also be a training input image producing unit. Correspondingly, the training output image providing unit may be a storage unit, a receiver unit and/or a training output image producing unit. The neural network providing unit may be a storage unit, a receiver unit and/or a neural network producing unit.

Correspondingly, a method for producing images is also described, wherein said method comprises:

providing input images in which structures that are in fact spatially separated are represented in a spatially superimposed manner in at least one spatial direction, providing a neural network which is adapted to produce, on the basis of input images in which structures that are in fact spatially separated are represented in a spatially superimposed manner in at least one spatial direction, output images in which the structures that are in fact spatially separated are represented in a spatially separated manner in the at least one spatial direction, and producing images on the basis of the input images provided and the neural network provided.

A training method for training a neural network is also described, said training method comprising the steps of:

providing training input images in which structures that are in fact spatially separated are represented in a spatially superimposed manner in at least one spatial direction, providing training output images in which the structures that are in fact spatially separated are represented in a spatially separated manner in the at least one spatial direction, providing a neural network, and training the neural network in such a way that the training output images are outputted when the training input images are inputted into the neural network.

Computer program code/instructions for producing images is also described, the computer program code being adapted to carry out the exemplary method for producing images when it is run on a the exemplary system for producing images.

Computer program code/instructions for training a neural network is also described, the computer program code being adapted to carry out the exemplary training method for training a neural network when it is run on the exemplary training device for training a neural network.

It should be understood that the exemplary system for producing images, the exemplary training device, the exemplary method for producing images, the exemplary training method, the exemplary computer program code for producing images and the exemplary computer program for training a neural network may have similar and/or identical embodiments.

Figure 1:
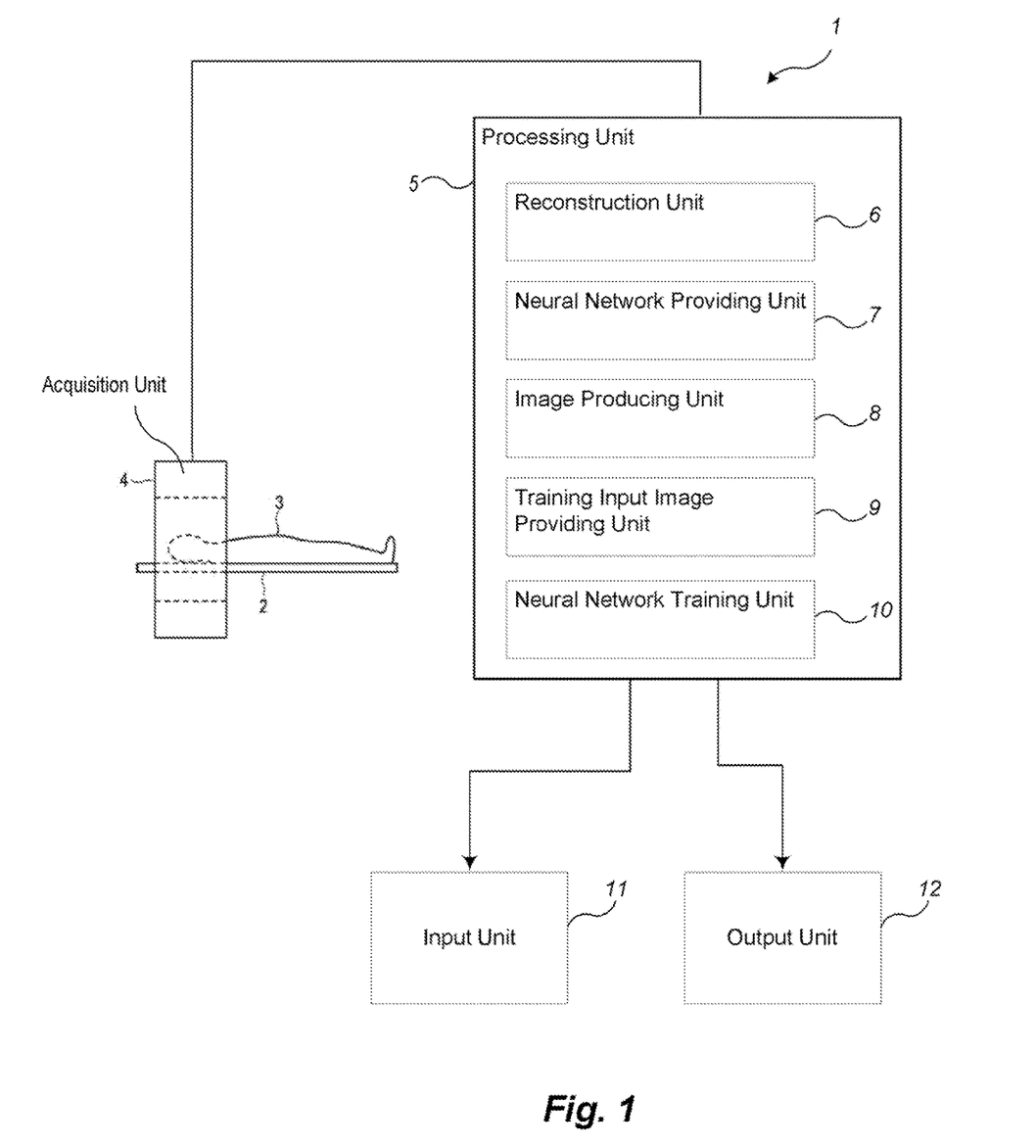
FIG. 1 shows, in schematic form and by way of example, an example embodiment of a system for producing images.

An embodiment of a system for producing images is shown in schematic form and by way of example in FIG. 1. System 1 comprises an acquisition unit 4 for generating MR signals, which are reconstructed by a reconstruction unit 6 located in a processing unit 5 to form MR images. Acquisition unit 4 has, in a known manner, a main magnet for generating a main magnetic field, gradient coils for spatial encoding, an excitation coil and multiple receiver coils. It is adapted to simultaneously excite multiple slices through a patient 3 lying on a patient couch 2, such that the respective receiver coil generates an MR signal that does not distinguish between structures located in the different slices. To begin with, two slices through the patient are simultaneously excited, for example, so that for ten receiver coils, for example, ten MR images can be reconstructed for that specific excitation, each MR image representing in a superimposed manner any structures located in the simultaneously excited slices. After that, two other slices may be simultaneously excited in order to produce, in this example, another set of ten MR images. If, in this example, exciting two different slices simultaneously is done a total of ten times, then ten sets of MR images are produced, each set comprising ten MR images that represent in a superimposed manner any structures located in the different respective slices. The ten sets of MR images, each set comprising ten MR images, are referred to in the following as input images.

System 1 further comprises a neural network providing unit 7 for providing a neural network which is adapted to produce, on the basis of input images in which structures that are in fact spatially separated are represented in a spatially superimposed manner in at least one spatial direction, output images in which the structures that are in fact spatially separated are represented in a spatially separated manner in the at least one spatial direction. System 1 also comprises an image producing unit 8 for producing images on the basis of the input images provided and the neural network provided. In this embodiment, the output images of the neural network and thus the images produced by image producing unit 8 are MR images. More specifically, one set of output images is generated for each of the ten aforementioned sets of input images, each output image showing one of the two slices in this example that were excited when generating the respective set of input images, so the output images show the structures located in different slices in a spatially separate manner. The output images of different sets are registered with each other.

Neural network providing unit 7 is adapted to provide a deep learning network as the neural network, which can also be called a deep network.

As the input images are produced by means of acquisition unit 4 and reconstruction unit 6, the latter units form an input image providing unit in this embodiment. However, acquisition unit 4 and reconstruction unit 6 can also be used to produce MR images of individual, separately excited slices through patient 3 or through some other object, such as an imaging phantom. These MR images, each showing individual slices, can be used as training output images for further training the provided neural network that has already been trained. Acquisition unit 4 and reconstruction unit 6 can thus be conceived of as forming a training output image providing unit, the training output image providing unit being adapted to provide training output images in which structures that are in fact spatially separated are shown in a spatially separated manner.

System 1 also comprises a training input image providing unit 9 for providing training input images in which structures that are in fact spatially separated are shown in a spatially superimposed manner in at least one spatial direction. In this embodiment, training input image providing unit 9 is adapted to synthetically produce the training input images on the basis of the training output images provided. For example, a plurality of training output images may be combined, or linearly combined, in particular, in order to produce a training input image.

System 1 also comprises a neural network training unit 10 for training the neural network in such a way that the training output images are outputted when the training input images are inputted into the neural network. In this embodiment, the neural network provided by neural network providing unit 7 is a previously trained network that can be further trained by neural network training unit 10. However, it is also possible that the system initially includes an untrained neural network which is trained by means of neural network training unit 10, after which this trained neural network can be provided by neural network providing unit 7. A separate training device 20, shown schematically and by way of example in FIG. 2, may also be used to train the neural network, however.

Figure 2:
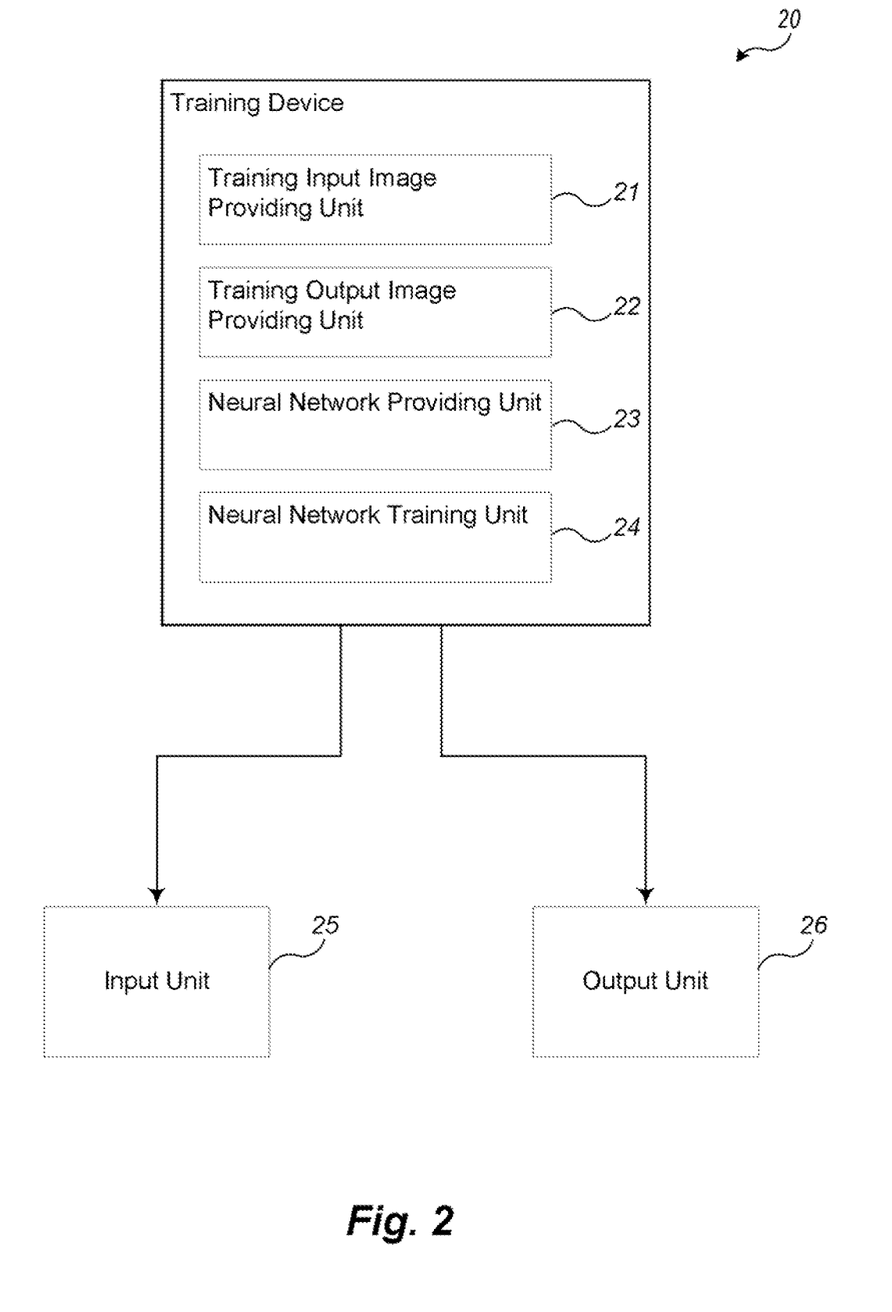
FIG. 2 shows, in schematic form and by way of example, an example embodiment of a training device for training a neural network.

Training device 20 comprises a training input image providing unit 21 for providing training input images in which structures that are in fact spatially separated are represented in a spatially superimposed manner in at least one spatial direction, and a training output image providing unit 22 for providing training output images in which the structures that are in fact spatially separated are represented in a spatially separated manner in the at least one spatial direction. Training device 20 also comprises a neural network providing unit 23 for providing an untrained neural network, and a neural network training unit 24 for training the neural network in such a way that the training output images are outputted when the training input images are inputted into the neural network. In this embodiment, training output image providing unit 22 is a storage unit in which MR images produced by means of MR measurements are stored as training output images. In this embodiment, each of these MR images represents a slice through an object. Training input image providing unit 21 is adapted in this embodiment to produce the training input images synthetically by combining respective training output images.

The neural network is composed of a plurality of levels which may comprise, for example, a plurality of "neurons". The depth of a neural network is determined by the number of layers in that network. The neural network includes an input layer and an output layer, the output layer being linked to the training output images and the input level being linked to the training input images. When the neural network is subjected to normal use, that is, when the neural network is not being trained, the input level is linked to the input images and the output level is linked to the output images.

Between the input level and the output level, the deep neural network has at least one further level that could be referred to as a "hidden" level. The neural network may comprise at least 15 of these "hidden" levels. Furthermore, the neural network may be structured in such a way that the number of neurons per hidden level decreases initially from the input level, and the number increases again after that until the output level is reached. The input level and the output level may also have the same number of neurons. In one example embodiment, the number of neurons decreases successively, starting from the input level and proceeding to a predetermined hidden level, to a similarly predetermined number of neurons, for example to a single neuron, after which the number of neurons successively increases again, starting from the predetermined hidden level and proceeding to the output level, until the number of neurons in the input level is reached ("U-networks").

The neural network can be trained in a series of steps, with the spatial resolution of the training images being gradually increased. Training images that are substantially free of errors can be used initially for training purposes, and training input images containing added effects, such as artifacts, and training output images without such effects, can later be used also and in particular to train a reduction of these effects. Examples of such effects are spatial displacements, distortions, variations in contrast for different system configurations, et cetera. These effects may be added computationally to the training input images. In one embodiment, training is performed in a first phase with increasing spatial resolution but without added effects, and in a second phase with constant spatial resolution and added effects.

The individual neurons of the neural network are connected by weighted functions. When the neural network is being trained, the weightings of the functions between the neurons are optimized by backpropagation for the problem being trained. For further details about training a neural network, reference is made to the article entitled "Deep Learning", by LeCun et al., in Nature, Vol. 521, pp. 436-444 (2015).

System 1 for producing images comprises an input unit 11, such as a keyboard, a computer mouse, a tablet computer, et cetera. System 1 for producing images also comprises an output unit 12, such as a display. Training device 20 also comprises corresponding input and output units 25, 26.

Figure 3:
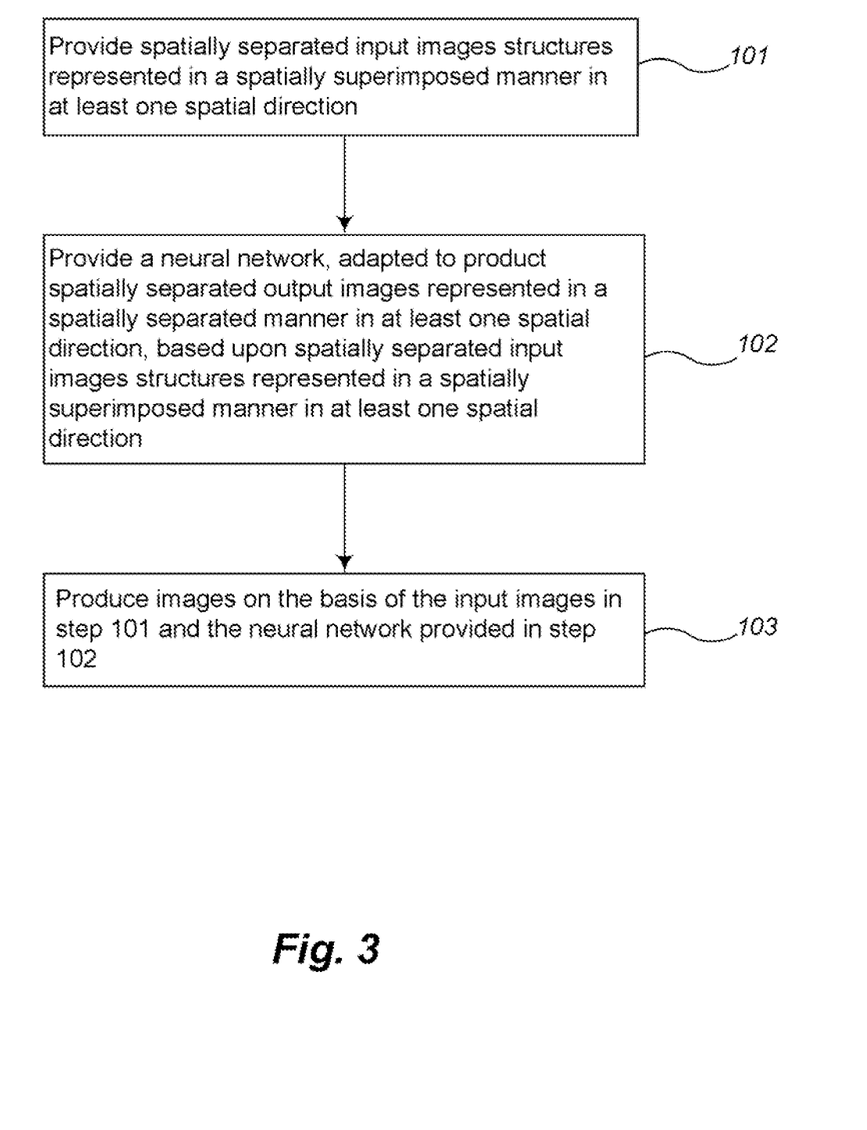
FIG. 3 shows a flow diagram illustrating an example embodiment of a method for producing images

In the following, an embodiment of a method for producing images shall be described by way of example with reference to a flow diagram that is shown in FIG. 3.

In step 101, input images are provided in which structures that are in fact spatially separated are represented in a spatially superimposed manner in at least one spatial direction. In step 102, a neural network is provided which is adapted to produce, on the basis of input images in which structures that are in fact spatially separated are represented in a spatially superimposed manner in at least one spatial direction, output images in which the structures that are in fact spatially separated are represented in a spatially separated manner in the at least one spatial direction. In step 103, images are produced on the basis of the input images provided in step 101 and the neural network provided in step 102.

Figure 4:
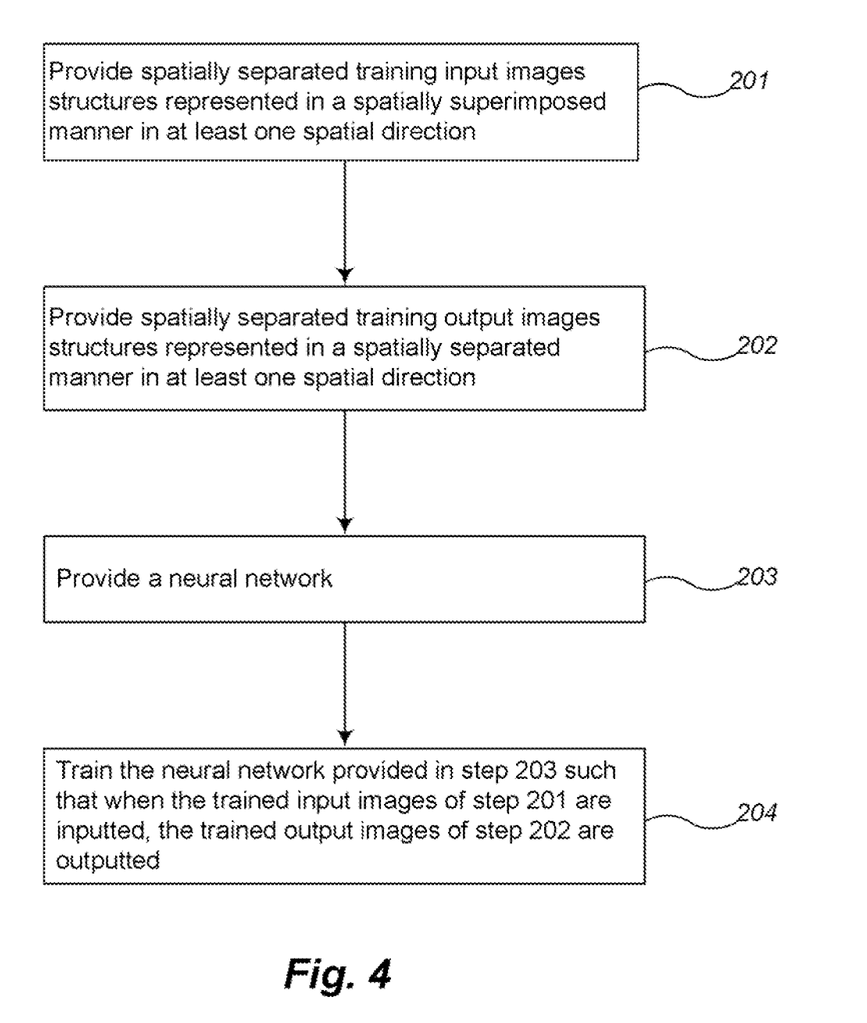
FIG. 4 shows a flow diagram illustrating an example embodiment of a training method for training a neural network.

In the following, an embodiment of a training method for training a neural network shall be described by way of example with reference to a flow diagram that is shown in FIG. 4.

In Step 201, training input images are provided in which structures that are in fact spatially separated are represented in a spatially superimposed manner in at least one spatial direction. In Step 202, training output images are provided in which the structures that are in fact spatially separated are represented in a spatially separated manner in the at least one spatial direction. In step 203, a neural network is provided, and in step 204 the neural network provided in step 203 is trained in such a way that when the training input images provided in step 201 are inputted into the neural network, the training output images provided in step 202 are outputted.

In a training phase, the neural deep learning network can approximate any linear or nonlinear function. During the training phase, on the basis of the training input images and the training output images, the neural deep learning network finds a model that results in the training output images when the training input images are inputted. After this training, the neural deep learning network automatically produces output images on the basis of input images. The trained neural deep learning network allows image data obtained by SMS measurement to be "separated" or deconvoluted, for example. This means that it allows separated or deconvoluted output images to be produced on the basis of input images obtained by SMS measurement. The output images can be produced without having to measure and take account of reference data, for example, as is necessary in the prior art described above. As the system in the embodiments described above with reference to FIG. 1 is capable of learning during use, the quality of the images produced can be further enhanced and/or the time needed to produce the images can be further reduced. More specifically, it is possible for the system to learn how to correct system-specific imperfections such as a $B_0$ inhomogeneity, a $B_1$ inhomogeneity, et cetera, so that the neural network can also make an appropriate correction automatically. Other image production steps can be identified by training the neural network accordingly and can therefore be replaced by this neural network.

The training input images and training output images can be provided partly synthetically, for example, and thus theoretically in any quantity. The image data of some MR measurements that have actually been performed on a system with a particular configuration, that is, with particular coil profiles, in particular, may serve as a kind of "gold standard" in this regard. Different object geometries and scan parameters can be subsequently mapped by subsequent simulation and integrated into the training process.

For example, by means of the SMS technique mentioned above, it is possible to produce initial training input images where multiple slices are simultaneously excited. Initial training output images can be produced by exciting each slice individually. These initial training input and training output images are preferably of high spatial resolution and can be used as a "gold standard" or benchmark, and may show, for example, a real person or a medical imaging phantom.

These initial training input and training output images can be used to define, without using a neural network, a system function or also a system response that is indicative for the characteristics of the system and the system configuration used to produce those images. This system function is indicative, for example, for the coil profiles, for inhomogeneities of the main magnetic field, et cetera, and can be used to calculate further synthetic training input images on the basis of further predefined training output images. These further training output images may be any image data records showing the different slices. They may be MR image data records, but may also be image data records for other modalities such as computed tomography image data records.

The initial training output images mentioned above can be used as training output images, as can other MR images obtained by measurement. Synthetic training input images can be generated by combining the training output images. For example, the training output images can be combined linearly, in particular by simple addition. Combining images can also take the form of a complex addition of training input images, in which case the amplitude and phase images are taken into consideration.

The training input and training output images may be amplitude images and/or phase images and/or combinations of amplitude and phase images.

The embodiments described above can be used to produce MR images relatively quickly, without having to acquire reference data separately and additionally. The relatively short time needed to produce the images can lead to a reduction in metrological uncertainties caused, for example, by motion of the object, in particular by patient motion, which includes conscious patient motion, and unconscious patient motion such as breathing. It should be emphasized that, after training has been performed, the neural network is very compact and fast in terms of the computing effort required, and it is possible for several image production steps to be joined or combined in a neural network and thus to be processed faster. Compared to the prior art mentioned at the outset, the trained neural network provides greater freedom of configuration in acquiring the MR signals and hence in producing the input images, as the trained neural network is capable not only of producing images by means of a defined system configuration and with fixed acquisition parameters, but can also process scenarios that have not been trained in an identical manner. This means that the neural network can handle tasks that are similar to training scenarios.

Although the input and output images in the above embodiments are MR images, the system for producing images and the training device can also be adapted to produce images from other modalities and to train neural networks for other modalities. Examples of these other modalities include: positron emission tomography (PET), single-photon emission computed tomography (SPECT) and computed tomography (CT).

Figure 5:
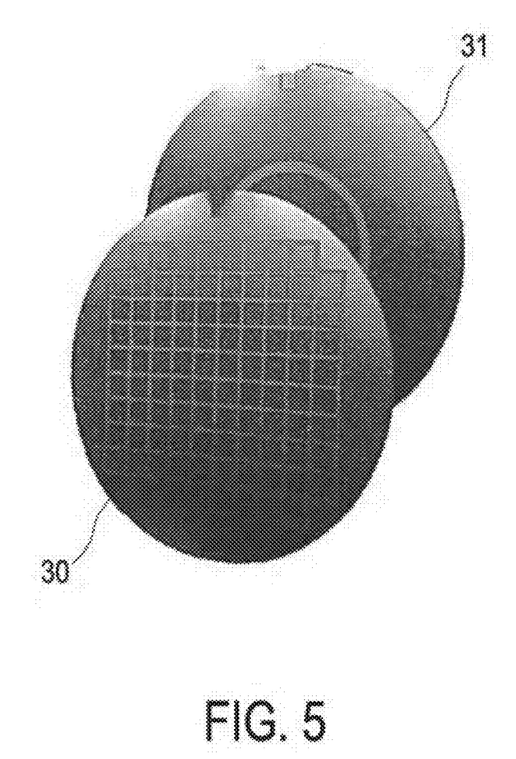
FIG. 5 shows, in schematic form and by way of example, two slices through an example object.
Figure 6:
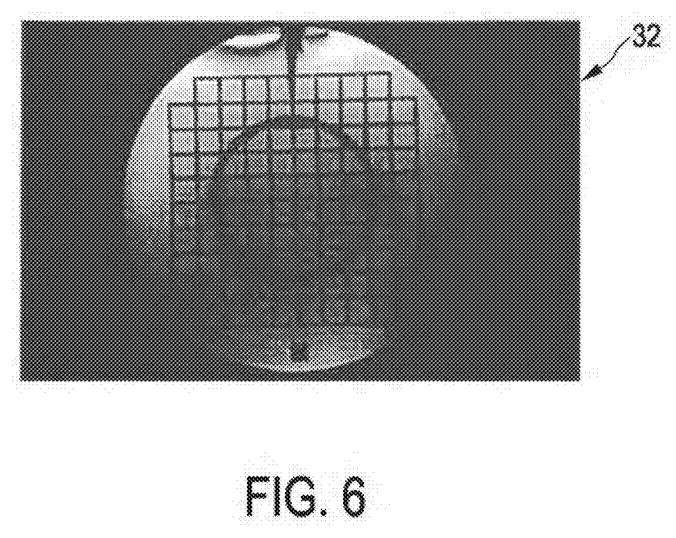
FIG. 6 shows an example input image, in schematic form and by way of example.
Figure 7:
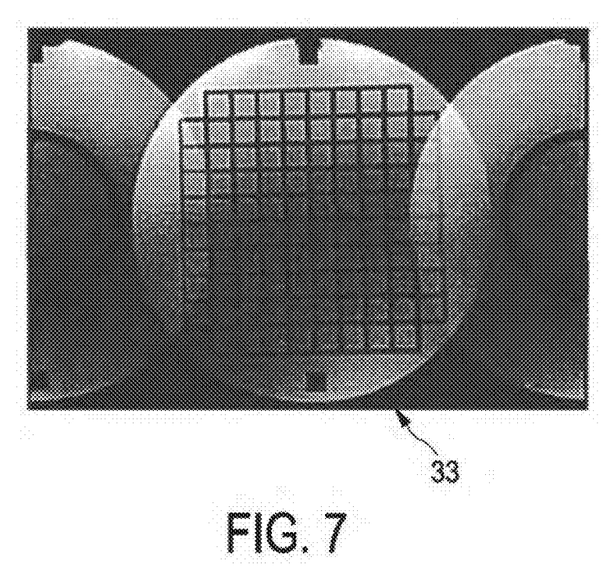
FIG. 7 shows, in schematic form and by way of example, another, alternative, example input image.

FIG. 5 shows, by way of example, two simultaneously excited slices 30, 31 through an object, with a grid structure in a first slice 30 and a circular structure in a second slice 31. The MR signals for these simultaneously excited slices 30, 31 are received by a receiver coil, after which these MR signals are used to produce an input image 32 shown by way of example in FIG. 6. As can be seen in FIG. 6, the structures that are in fact separated in the different slices 30, 31 are superimposed in input image 32. FIG. 7 shows another kind of superimposition, in which the slices have been moved relative to each other in the image plane of input image 33, where the structures in the different slices are still superimposed on each other perpendicularly to the plane of the image or sheet.

In other to obtain input image 33, the phase encoding of the jointly excited regions can be modulated in such a way that the slices are moved relative to each other in the plane of input image 33. This phase modulation can be brought about by high-frequency excitation, for example, or by modifying the magnetic field using gradient coils. To produce input image 33, the phase modulation was performed in such a way that slice 31 is moved by half of the image region in the phase encoding direction. Layer 30 does not experience any phase modulation and is therefore located in the middle of the image region. For further details of this phase modulation, reference is made to the article entitled "Controlled Aliasing in Parallel Imaging Results in Higher Acceleration (CAIPIRINHA) for Multi-Slice Imaging" by Breuer et al., Magnetic Resonance in Medicine, Vol. 53, pp. 684-691 (2005).

Figure 8:
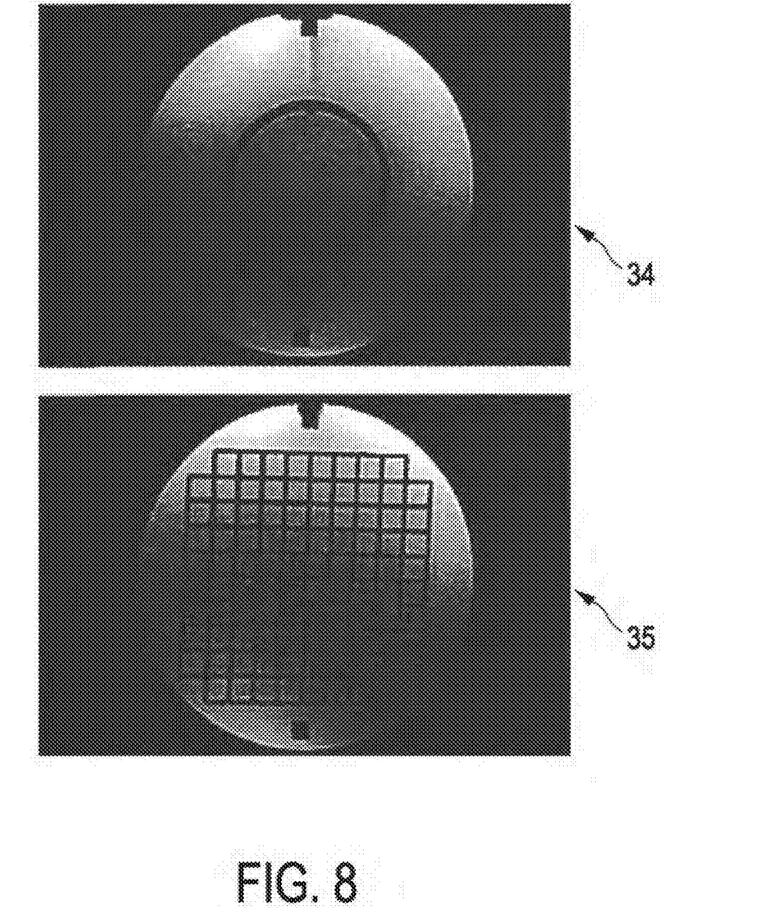
FIG. 8 shows two example output images, in schematic form and by way of example.

Input images 32 or input images 33 are produced for the different combinations of receiver coils and simultaneously excited slices, after which output images are produced on the basis of those input images with the aid of the neural network. The respective output images 34, 35 are shown by way of example in FIG. 8. As can be seen in FIG. 8, output image 34 shows only the circular structure and output image 35 shows only the grid structure, so in output images 34, 35, the structures located in the different slices are also represented in fact as separated from each other.

Although certain kinds of neural network have been described in the embodiments described above, other kinds of neural network can also be used to produce the images, in particular other deep neural networks. For example, neural networks having nonlinear pooling layers can be used.

In the claims, the words "comprise" and "include" do not exclude other elements or steps, and the indefinite article "a/an" does not exclude a plurality.

A single system, a single unit or a single device may perform the functions of several elements mentioned in the claims. The fact that individual functions and elements are mentioned in different dependent claims does not mean that a combination of these functions or elements could not also be used to advantage.

Operations such as providing input images, providing a neural network, producing images on the basis of the input images and the neural network, registering output images, providing training input images, providing training output images, training the neural network, et cetera, that are not performed by one or more units or devices, may also be performed by another number of units or devices. For example, providing the neural network, producing images on the basis of the input images and the neural network, and other operations may be performed by a single unit or by a plurality of units. These operations and/or controlling the system for providing images in accordance with the method for producing images, and/or controlling the training device in accordance with the training method may be implemented as program code of a computer program and/or as corresponding hardware.

A computer program such as in the form of computer code or instructions can be stored and/or distributed on a suitable computer-readable medium, for example on an optical storage medium or a solid-state storage medium which is operated in combination with or as part of other hardware. However, the computer program code can also be distributed in other forms, for example via the Internet or other telecommunications systems.

The invention claimed is:

1. A system for producing images, comprising:
   an input image providing unit structured to provide input images in which structures that are in fact spatially separated are represented in a spatially superimposed manner in at least one spatial direction, wherein the input images are magnetic resonance ("MR") images produced using a plurality of receiver coils;
   a neural network providing unit structured to provide a neural network that is adapted to produce, on the basis of input images in which structures that are in fact spatially separated are represented in a spatially superimposed manner in at least one spatial direction, output images in which the structures that are in fact spatially separated are represented in a spatially separated manner in the at least one spatial direction; and
   an image producing unit structured to produce the output images on the basis of the input images provided and the neural network provided, without using sensitivity profiles of the receiver coils.

2. The system of claim 1 wherein the output images are MR images.

3. The system of claim 2 wherein the input images are MR images produced by exciting a plurality of object regions to be imaged, wherein structures located in said regions are represented in a spatially superimposed manner in at least one spatial direction, and the output images are MR images in which the spatially separate structures located in the excited regions are represented in a spatially separated manner in the at least one spatial direction.

4. The system of claim 1 wherein the input image providing unit is further structured to provide multiple sets of input images, wherein input images from the same set are produced by exciting the same regions and by using multiple receiver coils, and input images from different sets are produced by exciting different regions, wherein the neural network is further structured to produce, for each set of input images, a set of output images in which the excited regions are represented in a spatially separated manner, and wherein the image producing unit is further structured to register the output images from different sets with each other.

5. The system of claim 1 wherein the neural network providing unit is adapted further structured to provide a deep learning network as the neural network.

6. The system of claim 1, further comprising:
   a training input image providing unit structured to provide training input images in which structures that are in fact spatially separated are represented in a spatially superimposed manner in at least one spatial direction;
   a training output image providing unit structured to provide training output images in which the structures that are in fact spatially separated are represented in a spatially separated manner in the at least one spatial direction; and
   a neural network training unit structured to train the neural network in such a way that the training output images are outputted when the training input images are inputted into the neural network.

7. The system of claim 6 wherein the training output image providing unit is structured to provide MR images of individual, separately excited regions of an object as training output images, such that structures located in different regions are not shown superimposed in any spatial direction in the training output images, and wherein the training input image providing unit is structured to provide training input images in which the structures located in the different regions are represented in a spatially superimposed manner in at least one spatial direction.

8. The system of claim 6 wherein the training input image providing unit is structured to provide training input images containing image artifacts, and the training output image providing unit is structured to provide training output images that do not contain the image artifacts.

9. The system of claim 7 wherein at least part of the training input images are produced by MR measurements.

10. The system of claim 7 wherein at least part of the training input images are synthetically produced on the basis of the training output images provided.

11. A training device for training a neural network, comprising:
a training input image providing unit structured to provide training input images in which structures that are in fact spatially separated are represented in a spatially superimposed manner in at least one spatial direction, wherein the input images are magnetic resonance ("MR") images produced using a plurality of receiver coils;
a training output image providing unit structured to provide training output images in which the structures that are in fact spatially separated are represented in a spatially separated manner in the at least one spatial direction;
a neural network providing unit structured to provide a neural network; and
a neural network training unit structured to train the neural network in such a way that the training output images are outputted when the training input images are inputted into the neural network, without using sensitivity profiles of the receiver coils.

12. A method for producing images, comprising:
providing input images in which structures that are in fact spatially separated are represented in a spatially superimposed manner in at least one spatial direction, wherein the input images are magnetic resonance ("MR") images produced using a plurality of receiver coils;
providing a neural network structured to produce, on the basis of input images in which structures that are in fact spatially separated are represented in a spatially superimposed manner in at least one spatial direction, output images in which the structures that are in fact spatially separated are represented in a spatially separated manner in the at least one spatial direction; and
producing images on the basis of the input images provided and the neural network provided, without using sensitivity profiles of the receiver coils.

13. A training method for training a neural network, comprising:
providing training input images in which structures that are in fact spatially separated are represented in a spatially superimposed manner in at least one spatial direction, wherein the input images are magnetic resonance ("MR") images produced using a plurality of receiver coils;
providing training output images in which the structures that are in fact spatially separated are represented in a spatially separated manner in the at least one spatial direction;
providing a neural network; and
training the neural network in such a way that the training output images are outputted when the training input images are inputted into the neural network, without using sensitivity profiles of the receiver coils.

14. A non-transitory computer-readable storage medium containing program code for controlling a system to produce images, by performing a method comprising:
providing input images in which structures that are in fact spatially separated are represented in a spatially superimposed manner in at least one spatial direction, wherein the input images are magnetic resonance ("MR") images produced using a plurality of receiver coils;
providing a neural network structured to produce, on the basis of input images in which structures that are in fact spatially separated are represented in a spatially superimposed manner in at least one spatial direction, output images in which the structures that are in fact spatially separated are represented in a spatially separated manner in the at least one spatial direction; and
producing images on the basis of the input images provided and the neural network provided, without using sensitivity profiles of the receiver coils.

15. A non-transitory computer-readable storage medium containing program code for controlling a system to train a neural network, by performing a method comprising:
providing training input images in which structures that are in fact spatially separated are represented in a spatially superimposed manner in at least one spatial direction, wherein the input images are magnetic resonance ("MR") images produced using a plurality of receiver coils;
providing training output images in which the structures that are in fact spatially separated are represented in a spatially separated manner in the at least one spatial direction;
providing a neural network; and
training the neural network in such a way that the training output images are outputted when the training input images are inputted into the neural network, without using sensitivity profiles of the receiver coils.

* * * * *

UNITED STATES PATENT AND TRADEMARK OFFICE
CERTIFICATE OF CORRECTION

| | | |
|---|---|---|
| PATENT NO. | : 11,055,883 B2 | Page 1 of 1 |
| APPLICATION NO. | : 16/317634 | |
| DATED | : July 6, 2021 | |
| INVENTOR(S) | : Markus Wenzel et al. | |

It is certified that error appears in the above-identified patent and that said Letters Patent is hereby corrected as shown below:

In the Claims

In Column 12, Line 49 (Claim 5), remove the word "adapted".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*